United States Patent [19]
Konwitz

[11] Patent Number: 5,710,855
[45] Date of Patent: Jan. 20, 1998

[54] PACKAGE FOR OPTICAL FIBERS SUPPORTED IN AN EASILY-VIEWABLE CLOSED LOOP

[75] Inventor: Ellie Konwitz, Ramat Gan, Israel

[73] Assignee: Laser Industries, Ltd., Tel Aviv, Israel

[21] Appl. No.: 570,864

[22] Filed: Dec. 12, 1995

[30] Foreign Application Priority Data

Dec. 20, 1994 [IL] Israel ................................ 112089

[51] Int. Cl.⁶ .................................................. G02B 6/00
[52] U.S. Cl. ........................................ 385/135; 134/136
[58] Field of Search ................................ 385/134–137

[56] References Cited

U.S. PATENT DOCUMENTS 5,412,751  5/1995  Siemon et al. ........................ 385/135

FOREIGN PATENT DOCUMENTS 3228002  10/1991  Japan ...................................... 385/135

Primary Examiner—Phan T. H. Palmer
Attorney, Agent, or Firm—Cobrin Gittes & Samuel

[57] ABSTRACT

A package for an optical fiber includes a mounting sheet material, and a plurality of clips carried by the mounting sheet in a closed-loop, e.g., circular or oblong array. Each of the clips has a pair of jaws for receiving between them an optical fiber to be wound around, and releasably retained by, the array of clips.

14 Claims, 3 Drawing Sheets

PACKAGE FOR OPTICAL FIBERS SUPPORTED IN AN EASILY-VIEWABLE CLOSED LOOP

FIELD AND BACKGROUND OF THE INVENTION

The present invention relates to a package for optical fibers, particularly optical fibers used in laser surgery.

Optical fibers, now widely used in laser surgery for conducting laser energy to a working site, are very expensive, costing in the order of $100–$600 for a length of about 1–3 meters. Moreover, they are extremely fragile and easily breakable when bent too sharply.

Various packaging arrangements have been developed for packaging optical fibers for use in laser surgery. One known packaging arrangement includes a mounting sheet integrally formed with projecting formations for supporting the optical fiber in a loop. In this form of packaging, however, it is difficult to pay out only a short length of the fiber as and when needed; moreover, the fiber cannot be readily rewound for resue.

In another known packaging arrangement, two sheets are bound together to form a spool between them around which the fiber is wound, enabling only predetermined lengths of the fiber to be payed out. However, in such a packaging arrangement, the fiber itself cannot be readily viewed from the outside as it is covered by the two sheets; moreover, the fiber also with this packaging arrangement cannot be readily rewound into the spool for reuse.

OBJECTS AND BRIEF SUMMARY OF THE INVENTION

An object of the present invention is to provide a novel packaging arrangement for optical fibers having advantages in the above respects.

According to a broad aspect of the present invention, there is provided a package for an optical fiber comprising: a mounting sheet; and a plurality of clips fixed to a face of the mounting sheet in a closed-loop array, each of the clips having a retainer formation for receiving and releasably retaining an optical fiber when wound thereon.

According to further features in the preferred embodiment of the invention described below, each of the clips is formed with a pair of jaws, constituting the retainer formation, for receiving and releasably retaining an optical fiber. The pair of jaws are open at the side of the respective clip facing away from the center of the closed-loop array of clips. Preferably, the closed-loop array is a circular array, although it could be of other configurations, such as elliptical.

According to still further features in the described preferred embodiment, the mounting sheet is formed with a recess at one side of the array of clips and tangential thereto for receiving and retaining one end of the optical fiber, and with a second recess at another side of the circular array of clips and tangential thereto for receiving and retaining the opposite end of the optical fiber. The first and second recesses are parts of peripheral recesses formed in one face of the mounting sheet around the plurality of clips such that the recesses appear in the opposite face of said mounting sheet as ribs which stiffen the mounting sheet.

According to yet further features in the described preferred embodiment, the mounting sheet is further formed with an annular recess for receiving the optical fiber, and the plurality of clips are fixed along the mounting sheet in the annular recess. In addition, the mounting sheet is formed with a cylindrical surface on the inner side of the annular recess and extending substantially perpendicular to the mounting sheet. The cylindrical surface is formed with a plurality of slots, one for and receiving each of the clips, extending radially inwardly a short distance such that the surface of each clip engaged by the optical fiber when received therein is adjacent to said cylindrical surface of the mounting sheet.

Each clip is of plastic material and is integrally formed with upper and lower jaws interconnected by an integral hinge permitting the upper jaw to move to an open or closed position with respect to the lower jaw or Jaws.

As will be more particularly described below, such a packaging arrangement for optical fibers holds the optical fiber in a manner permitting the fiber to be seen, and also permitting the user to pay out either the complete fiber, or a desired length of the fiber, as and when needed and according to the length needed. In addition, such a packaging arrangement enables the fibers to be reused, and also accepts optical fibers of different fiber diameters.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
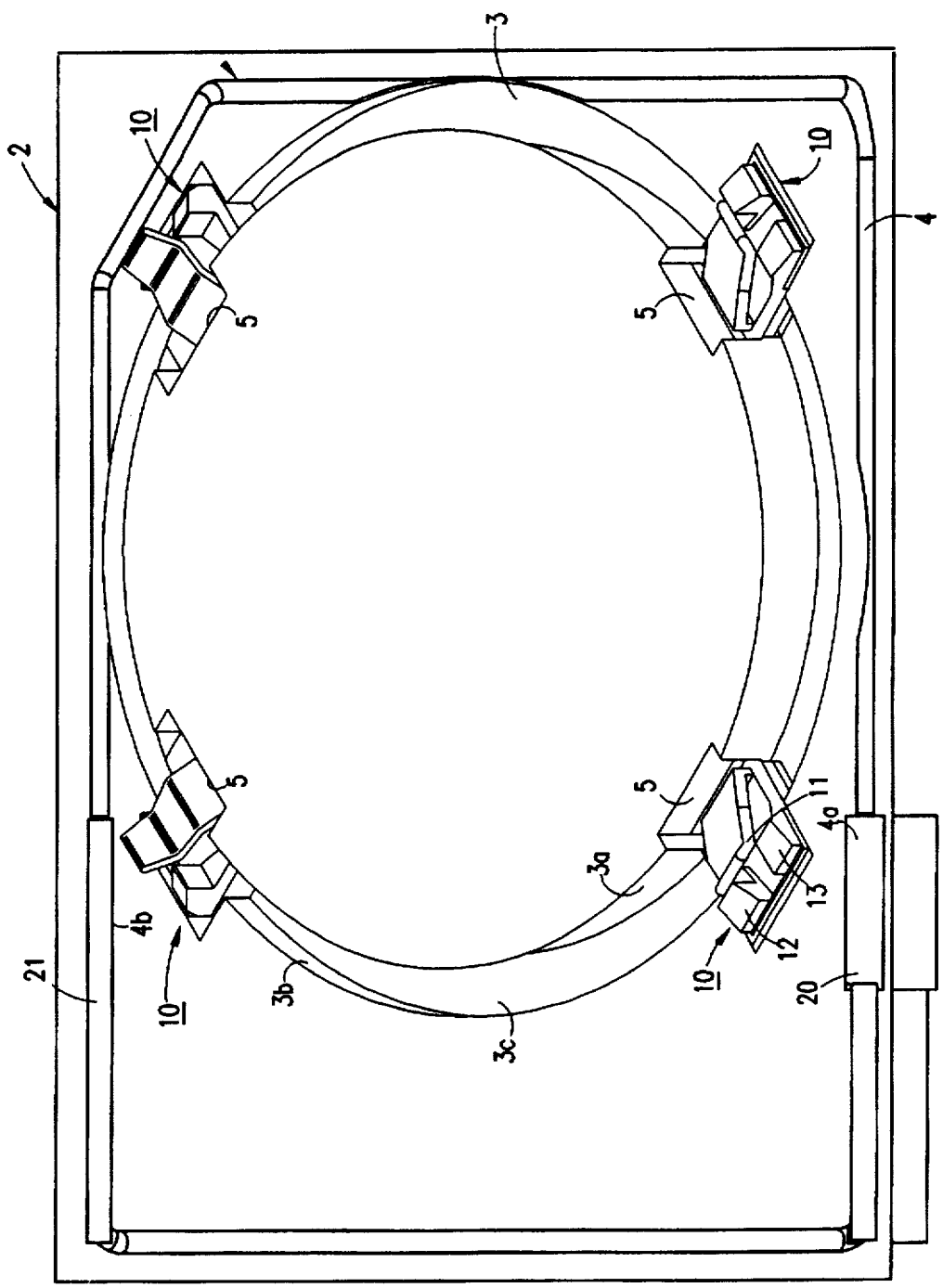
FIG. 1 is a three-dimensional view illustrating one form of packaging arrangement in accordance with the invention for optical fibers particularly useful in laser surgery.

The packaging arrangement illustrated in the drawings is particularly useful for packaging optical fibers for use in laser surgery, and provides a number of advantages when so used: thus, it is constructed to hold optical fibers in a manner which permits the optical fiber, or any desired length thereof, to be payed out as and when needed; it permits the optical fiber to be viewed and to be rewound for reuse; and it accepts optical fibers of a large range of fiber diameters.

Figure 2:
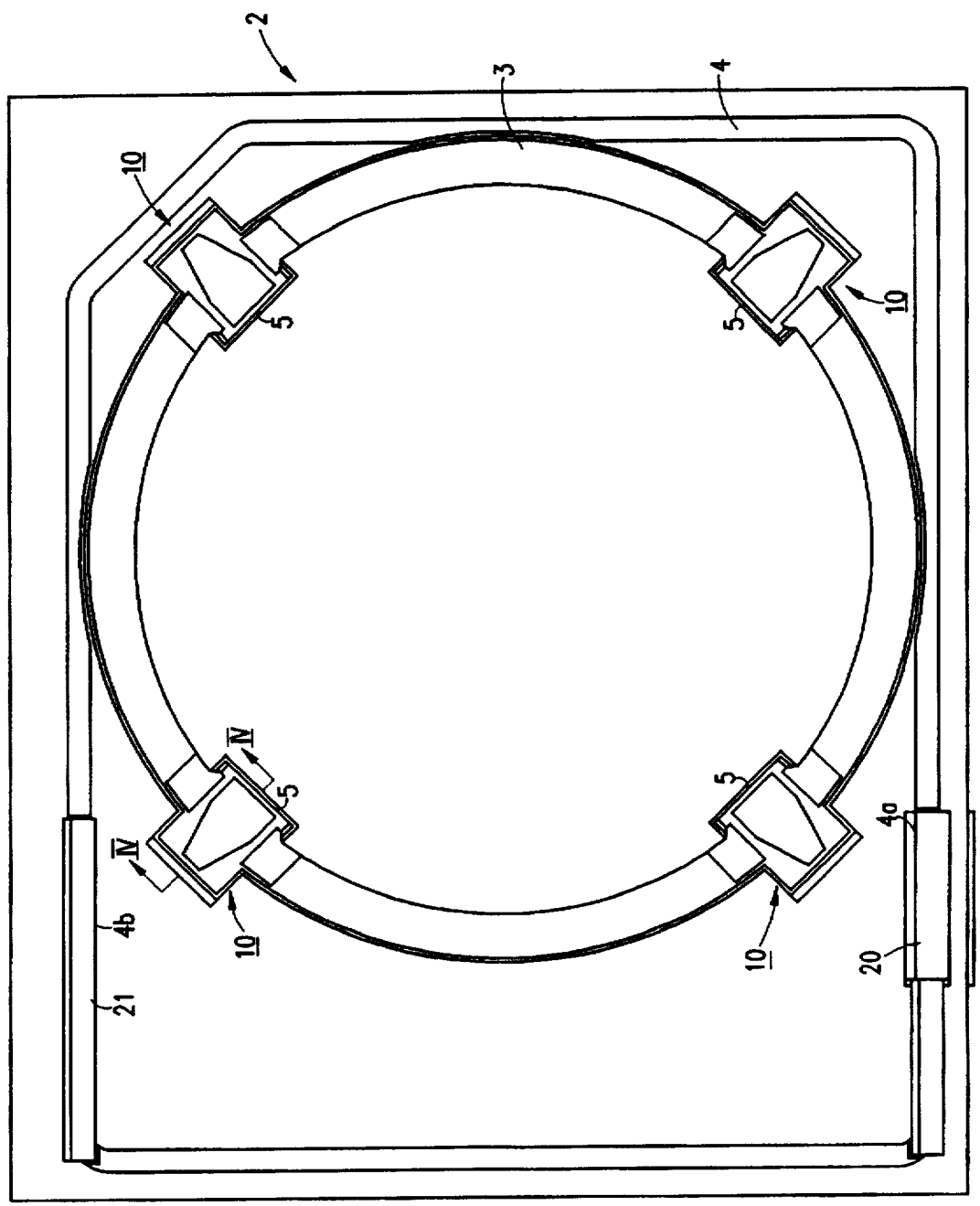
FIG. 2 is a top plan view of the packaging arrangement of FIG. 1.

The packaging arrangement illustrated in the drawings comprises a mounting sheet, generally designated 2, of stiff sheet material, such as plastic. Mounting sheet 2 is vacuum-formed with an inner annular recess 3 and with an outer recess 4 around the periphery of the sheet. It will be appreciated that recesses 3 and 4 appear as recesses when viewed from one face of the sheet, namely the face shown in FIGS. 1 and 2, but appear as ribs projecting outwardly from the opposite face of the sheet. As will be described more particularly below, recess 3 serves primarily as an annular cavity for retaining the packaged optical fiber OF (FIG. 4) in a closed-loop form, whereas recess 4 serves to releasably retain the ends of the optical fiber tangentially to the loop. Both recesses 3 and 4, particularly the ribs defined by them, especially that of recess 4, on the opposite face of the mounting sheet 2, also serve to stiffen the mounting sheet 2.

Circular recess 3 includes an inner cylindrical wall 3a and an outer cylindrical wall 3b. Both walls are generally perpendicular to the plane of the sheet 2 and are joined by an intermediate circular wall 3c parallel to the plane of the sheet. As shown particularly in FIG. 4, wall 3c defines the bottom of the recess on one face of the mounting sheet, and the rib on the opposite face. Mounting sheet 2 is vacuum-formed to produce a slot formation 5 at spaced locations in the inner and outer cylindrical walls 3a, 3b, and extending a small distance in the radial direction. In the example illustrated in FIGS. 1 and 2, there are four such slot formations 5.

A plurality of clips, generally designated 10, are fixed within the inner recess 3 at each of the slot formations 5. Clips 10 thus define a circular array of clips for receiving the optical fiber in looped form. For this purpose, each of the clips 10 includes an upper jaw 11 and a pair of lower jaws 12, 13. These jaws are open at the outer side of the respective clip, i.e., the side facing away from the center of the circular array, in order to receive the optical fiber OF (FIG. 4) and to hold it in loop form. The two lower jaws 12, 13 are spaced apart in the circumferential direction of recess 3, and the upper jaw 11 overlies the space between the two lower jaws.

Figure 3:
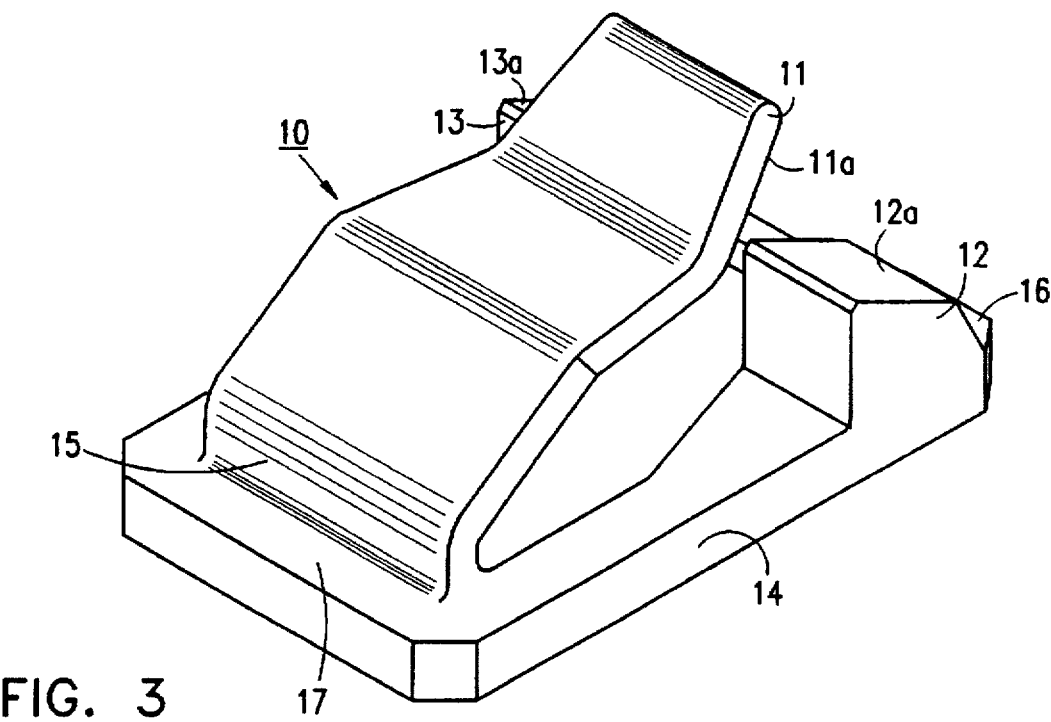
FIG. 3 is a perspective view illustrating one of the clips used in the packaging arrangement of FIGS. 1 and 2.
Figure 4:
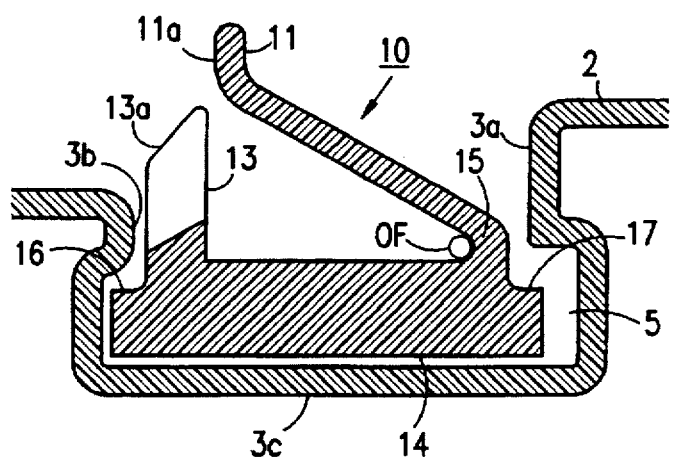
FIG. 4 is an enlarged sectional view along line IV—IV of FIG. 2 but also illustrating the optical fiber received within the respective clip.

FIG. 3 more particularly illustrates the construction of each clip 10, and FIG. 4 illustrates the manner in which each clip is fixed to the mounting sheet 2. Each clip 10 is made of a plastic material and is integrally formed with a base 14 from which the two lower jaws 12, 13 project, and with an integral hinge 15 connecting the upper jaw 11 to the base. The underface of the upper jaw 11 includes a tapered surface 11a, and the upper faces of the two fixed jaws 12, 13 include oppositely tapered surfaces 12a, 13a, to facilitate the insertion of the optical fiber between the jaws.

In the normal condition of the clip as illustrated in FIG. 4, the underface 11a of the upper jaw 11 is located with respect to the tapered surfaces 12a, 13a of the two lower jaws 12, 13, such that the optical fiber OF may be easily received between the jaws and retained there, and may also be easily removed, by only slightly moving the upper jaw with respect to the lower jaws, as permitted by the integral hinge 15.

Base 14 of each clip 10 is further formed with a ledge 6 (FIGS. 3, 4) projecting radially from the two fixed jaws 12, 13, and another ledge 17 on the opposite side projecting radially from the integral hinge 15. These two ledges 16, 17 of the clips 10 are used for fixing the clips to the mounting sheet 2. Thus, as shown particularly in FIG. 4, the mounting sheet 2 is vacuum formed so as to curl around the two ledges 16, 17 defining the slots 5, during the vacuum formation process, thereby anchoring the clips to the mounting sheet.

When the optical fiber OF (FIG. 4) is applied to the clips 10 so fixed to the mounting sheet 2, the optical fiber engages the inner surface of the integral hinge 15. As shown in FIG. 4, this inner surface is adjacent to, preferably nearly flush with, the inner cylindrical wall 3a of the annular recess 3 by virtue of the radial slots 5, such as that the optical fiber is supported in a substantially smoothly continuous loop.

The outer recess 4 serves to stiffen the mounting sheet 2 since it defines a projecting rib formation when viewed from the lower side of the mounting sheet 2 as described above. However, recess 4 also serves to removably receive the two ends of the optical fiber OF when mounted within the inner recess 3 wherein the optical fiber is retained in loop form by the plurality of clips 10 as also described above. Thus, the portion of recess 4 shown at 4a (FIG. 1) may be dimensioned to receive a connector 20 carried at the proximal end of the optical fiber (i.e., the laser end connected to the laser); whereas section 4b of recess 4 may be dimensioned to removably receive a connector 21 carried at the distal end of the optical fiber (i.e., the working end delivering the laser energy to the working site). It will be seen that both recess sections 4a and 4b are substantially tangential to the inner recess 3 so that they support the ends of the optical fiber without sharp bends.

Where it may be desired to have a relatively long straight section at either or both ends of the optical fiber, the mounting sheet 2 would be extended in the respective direction. Thus, the inner recess 3 need not be in the center of the mounting sheet 2, but could be located more remote from one end of the mounting sheet to provide a longer straight section, 4a or 4b, of the peripheral recess 4 for the respective fiber end.

The mounting sheet 2, including the plurality of clips 10 fixed thereto, may thus be used for packaging an optical fiber OF (FIG. 4) in the form of a large loop such that the optical fiber, or any desired length thereof, may be removed in a convenient manner as and when desired and according to the length desired, with minimum danger of breaking the optical fiber. The mounting sheet 2, with the optical fiber supported therein in loop form as described above, would be enclosed by a transparent plastic cover sheet (not shown), and would be supplied in a sterile condition. The illustrated package arrangement also enables the optical fiber to be rewound within the inner recess 3, and to be retained by the plastic clips 10, by merely inserting one end of the fiber into recess section 4a, winding it around the outer side of the clips 10 while applying a light force to the fiber to cause the upper jaws 11 of the clips to open, and then inserting the other end of the optical fiber into recess section 4b.

While the invention has been described with respect to one preferred embodiment, it will be appreciated that this is set forth merely for purposes of example, and that many variations may be made. For example, the inner recess receiving the optical fiber in loop form may be of other closed-loop configurations, e.g., of elliptical or oblong configuration, in which case the array of clips 10 would be of the corresponding closed-loop configuration. In addition, the clips could include jaws which open from the top, permitting the optical fiber to be inserted from the tops of the clips, rather than from their sides facing outwardly of the center of the mounting sheet. Many other variations, modifications and applications of the invention may be made.

I claim:

1. A package for an optical fiber, comprising:

a mounting sheet;

and a plurality of clips fixed to a face of said mounting sheet in a closed-loop array, each of said clips having a retainer formation for receiving and releasably retaining an optical fiber when wound thereon, said mounting sheet being formed with an annular recess for receiving the optical fiber, and said plurality of clips being fixed to the mounting sheet along said annular recess, each of said clips being formed with a pair of jaws, constituting said retainer formation, for receiving and releasably retaining an optical fiber, said pair of jaws being open at the side of the respective clip facing away from the center of the closed-loop array of clips.

2. A package for an optical fiber, comprising:

a mounting sheet;

and a plurality of clips fixed to a face of said mounting sheet in a closed-loop array, each of said clips having a retainer formation for receiving and releasably retaining an optical fiber when wound thereon, said mounting sheet being formed with an annular recess for receiving the optical fiber, and said plurality of clips being fixed to the mounting sheet along said annular recess, said mounting sheet being formed with a cylindrical surface on the inner side of said annular recess and extending substantially perpendicular to the mounting member, said cylindrical surface being formed with a plurality of slots extending radially inwardly a distance such that the surface of each clip engaged by the optical fiber when received therein is adjacent to said cylindrical surface of the mounting sheet.

3. A package for an optical fiber, comprising:

a mounting sheet;

and a plurality of clips fixed to a face of said mounting sheet in a closed-loop array, each of said clips having a retainer formation for receiving and releasably retaining an optical fiber when wound thereon, said mounting sheet being formed with an annular recess for receiving the optical fiber, and said plurality of clips being fixed to the mounting sheet along said annular recess, each of said clips being integrally formed with a base fixed to said mounting sheet, said base of each clip being formed with ledges on opposite sides, and said mounting sheet being vacuum formed to engage said ledges to fix the clips to the mounting member.

4. A combination of an optical fiber, and a package therefor; said package comprising a mounting sheet, and a plurality of clips fixed to a face of said mounting sheet in a closed-loop array, each of said clips having a retainer formation for receiving and releasably retaining the optical fiber wound thereon, said mounting sheet being formed with a peripheral recess around said circular array of clips and tangential thereto for receiving and retaining the opposite ends of the optical fiber.

5. A package for an optical fiber, comprising:

a mounting sheet;

and a plurality of clips fixed to a face of said mounting sheet in closed-loop array, each of said clips having a retainer formation for receiving and releasably retaining an optical fiber when wound thereon;

said mounting sheet being formed with a recess at one side of the closed-loop array of clips and tangential thereto for receiving and retaining one end of the optical fiber.

6. The package according to claim 5, wherein said mounting sheet is formed with a second recess at another side of the closed-loop array of clips and tangential thereto for receiving and retaining the opposite end of the optical fiber.

7. The package according to claim 6, wherein said first and second recesses are parts of a peripheral recess formed in one face of said mounting sheet around said closed-loop array of clips, the opposite face of said mounting sheet being formed with a corresponding peripheral rib to stiffen the mounting sheet.

8. The package according to claim 6, wherein said mounting sheet is formed with an annular recess for receiving the optical fiber, said plurality of clips are fixed to the mounting sheet along said annular recess, and said first and second recesses for receiving the ends of the optical fiber are tangential to said annular recess.

9. A combination of an optical fiber, and a package therefor, said package comprising a mounting sheet, and a plurality of clips fixed to a face of said mounting sheet in a closed-loop array, each of said clips having a retainer formation for receiving and releasably retaining the optical fiber wound thereon, said mounting sheet being formed with a cylindrical surface on the inner side of an annular recess and extending substantially perpendicular to the mounting member, said cylindrical surface being formed with a plurality of slots extending radially inwardly a distance such that the surface of each clip engaged by the optical fiber when received therein is substantially flush with said cylindrical surface of the mounting member.

10. A package for an optical fiber, comprising:

a mounting sheet;

and a plurality of clips fixed to a face of said mounting sheet in a closed-loop array, each of said clips having a retainer formation for receiving and releasably retaining an optical fiber when wound thereon;

each of said clips being of plastic material and integrally formed with an upper jaw and a lower jaw underlying said upper jaw and interconnected therewith by an integral hinge permitting the upper jaw to move to an open or closed position with respect to said lower jaw.

11. The packaged according to claim 10, wherein there are two of said lower jaws spaced from each other, and said upper jaw is hingedly mounted to overlie the space between said two lower jaws.

12. The packaged according to claim 10, wherein said upper jaw of each clip is formed with a tapered mouth facilitating the insertion of the optical fiber.

13. The packaged according to claim 10, wherein said lower jaw of each clip is formed with a tapered mouth facilitating the insertion of the optical fiber.

14. A combination of an optical fiber, and a package therefor, said package comprising a mounting sheet, and a plurality of dips fixed to a face of said mounting sheet in a closed-loop array, each of said clips having a retainer formation for receiving and releasably retaining the optical fiber wound thereon, each of said clips being of plastic material and being integrally formed with a pair of jaws interconnected by an integral hinge permitting one jaw to move to an open or closed position with respect to the other jaw.

* * * * *